(12) United States Patent
Poole et al.

(10) Patent No.: US 12,463,520 B2
(45) Date of Patent: Nov. 4, 2025

(54) ELECTRODYNAMIC BRAKING SYSTEMS, DEVICES, AND METHODS

(71) Applicant: Orthopedic Wellness Laboratories, Inc., Woodinville, WA (US)

(72) Inventors: Aaron D. Poole, Woodinville, WA (US); Joseph E. Skidmore, Woodinville, WA (US); Brad H. Walker, Woodinville, WA (US); Jerrold L. Gray, Woodinville, WA (US); Rajen N. Shah, Woodinville, WA (US); Roy P. Diaz, Woodinville, WA (US)

(73) Assignee: Orthopedic Wellness Laboratories, Inc., Woodinville, WA (US)

( * ) Notice: Subject to any disclaimer, the term of this patent is extended or adjusted under 35 U.S.C. 154(b) by 338 days.

(21) Appl. No.: 17/942,312

(22) Filed: Sep. 12, 2022

(65) Prior Publication Data
US 2023/0082352 A1 Mar. 16, 2023

Related U.S. Application Data

(60) Provisional application No. 63/243,008, filed on Sep. 10, 2021.

(51) Int. Cl.
*H02K 49/04* (2006.01)
*A63B 21/00* (2006.01)
(Continued)

(52) U.S. Cl.
CPC ......... *H02K 49/04* (2013.01); *A63B 21/0056* (2013.01); *A63B 21/4003* (2015.10); *A63B 23/025* (2013.01)

(58) Field of Classification Search
CPC .. H02K 49/04; H02K 2213/03; H02K 49/046; A63B 21/0056; A63B 21/4003;
(Continued)

(56) References Cited

U.S. PATENT DOCUMENTS 4,800,310 A * 1/1989 Nakao ................ A63B 22/0605
 482/901
5,254,061 A * 10/1993 Leask ................ A63B 21/0052
 482/903

(Continued)

FOREIGN PATENT DOCUMENTS

CA 3150539 A1 * 9/2021 .............. B60L 13/06

*Primary Examiner* — Sundhara M Ganesan
(74) *Attorney, Agent, or Firm* — Lee & Hayes, P.C.

(57) ABSTRACT

Systems, devices, and methods are described for providing, among other things, an electrodynamic contactless braking system. In an embodiment, the electrodynamic contactless braking system may include plurality of electromagnet assemblies arranged and configured to have alternating magnetic field orientations. In an embodiment, each electromagnet assembly may include an air gap formed between a first electromagnet pole and a second electromagnet pole. In an embodiment, each electromagnet assembly is configured to generate a magnetic field of a character and for a duration sufficient to induce eddy currents on an electrically-conductive element moving within the air gap of each of the plurality of electromagnets. In an embodiment, the electrodynamic contactless braking system may include a controller operatively coupled to each of the plurality of electromagnets, the controller configured operate the plurality of electromagnets in parallel.

18 Claims, 13 Drawing Sheets

(51) Int. Cl.
*A63B 21/005* (2006.01)
*A63B 23/025* (2006.01)

(58) Field of Classification Search
CPC ............. A63B 23/025; A63B 2220/10; A63B 21/0052
See application file for complete search history.

(56) References Cited

U.S. PATENT DOCUMENTS

| | | | |
|---|---|---|---|
| 8,957,641 B1 * | 2/2015 | Hsu | A63B 24/0087 322/4 |
| 2010/0144492 A1 * | 6/2010 | Ruan | A63B 21/4003 482/10 |
| 2013/0002073 A1 * | 1/2013 | Wang | A63B 23/03516 310/105 |
| 2020/0222754 A1 * | 7/2020 | Walker | A63B 23/025 |

* cited by examiner

ELECTRODYNAMIC BRAKING SYSTEMS, DEVICES, AND METHODS

SUMMARY

In an aspect, the present disclosure is directed to, among other things, an electrodynamic contactless braking system. In an embodiment, the electrodynamic contactless braking system may include a plurality of electromagnets arranged and be configured to have alternating magnetic field orientations. In an embodiment, each electromagnet may include an air gap formed between a first electromagnet pole and a second electromagnet pole. In an embodiment, each electromagnet is configured to generate a magnetic field of a character and for a duration sufficient to induce eddy currents on an electrically-conductive element moving within the air gap of each of the plurality of electromagnets. In an embodiment, the electrodynamic contactless braking system may include a controller operatively coupled to each of the plurality of electromagnets and be configured to operate the plurality of electromagnets in parallel.

In an aspect, the present disclosure is directed to, among other things, an orthopedic device comprising means for applying a contactless drag force on an electrically-conductive element forming part of a spinal resistance assembly; and means for operating a plurality of electromagnets so as to generate alternating magnetic field orientations.

Figure 1A:
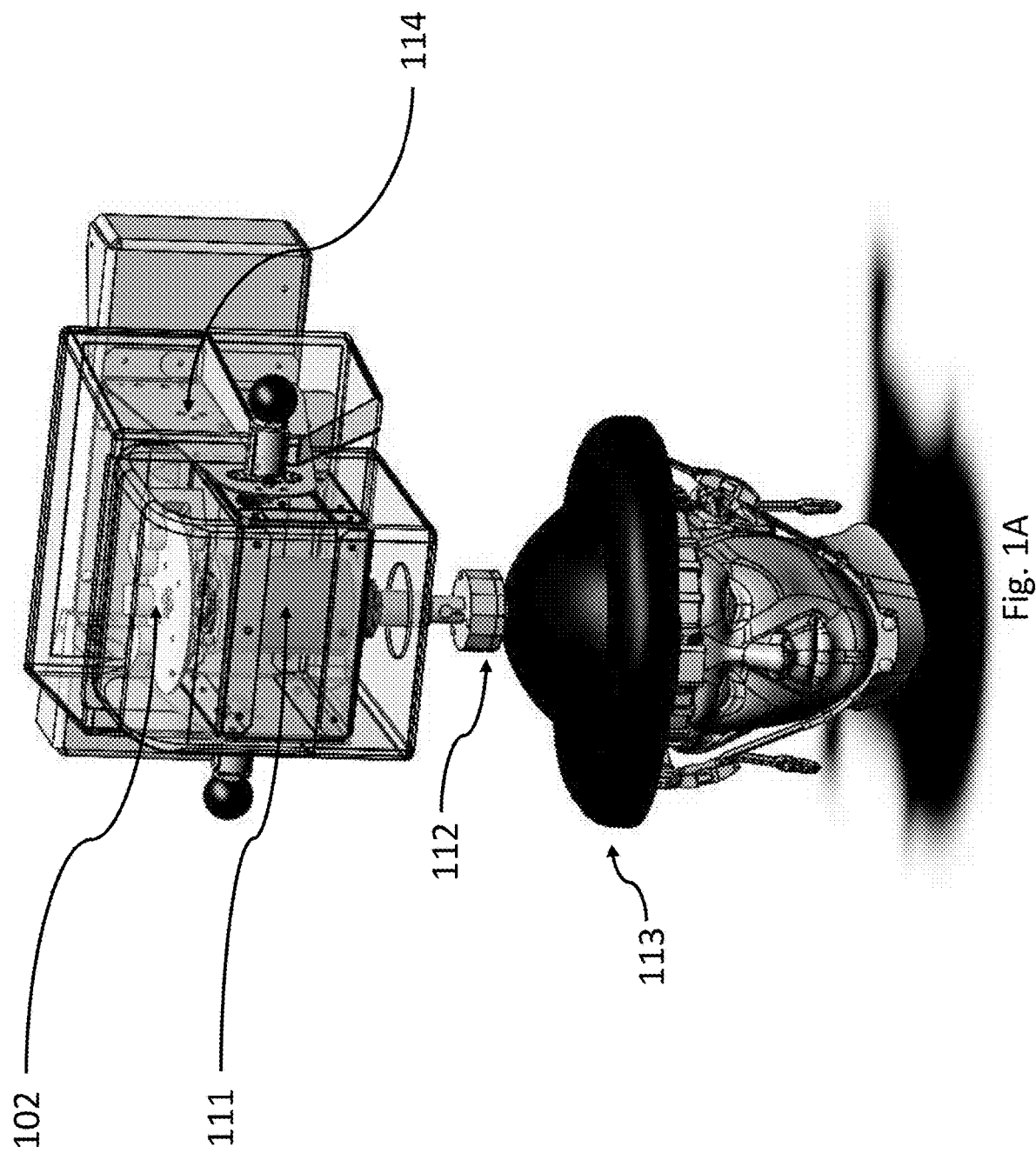
FIG. 1A is a schematic diagram of an electrodynamic contactless resistance or braking assembly according to an embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented here.

DETAILED DESCRIPTION

Musculoskeletal disorders are the second most common cause of disability worldwide, measured by years lived with disability. Storheim K, Zwart J A *Musculoskeletal disorders and the global burden of disease study*. Ann Rheumatic Dis 73: 949-950 (2014); see also Hoy D, March L, Brooks P, et al. *The global burden of low back pain: estimates from the Global Burden of Disease 2010 study*. Ann Rheum Dis 2014; 73:968-74. The most common musculoskeletal disorders are neck and low back pain. Neck pain plagues approximately a quarter of the population at any given time, resulting in increased medical costs, loss of productivity, and adds to the proliferation of pain medications.

Neck pain results from many causes including degenerative conditions, trauma, and sports injuries. Injury and degeneration of the cervical spine have also been shown to cause tension headaches, nerve injury in the neck. These conditions are still poorly understood, and clinicians are often left with a trial and error strategy regarding diagnostic investigation and treatment.

Systematic reviews reveal that existing treatments have only small effects at best, regardless of whether the intervention is based on a biological, psychological, or social approaches. Accordingly, there is potential for better management by implementing effective health promoting actions and evidence supporting the recommendation of preventive measures such as weight loss and exercise for low back pain. Storheim K, Zwart J A *Musculoskeletal*

*disorders and the global burden of disease study.* Ann Rheumatic Dis 73: 949-950 (2014)

Degenerative disc disease and neck injuries, including whiplash, result in loss of curvature of the spine and decreases in range of motion. The neck moves in multiple planes including flexion and extension and rotation. Many devices allow strengthening of flexion and extension, however increasing rotational strength and mobility is critical to preventing and recovering from age-related problems, motor vehicle accidents, and sports related incidents. Recent studies have also shown that increased neck strength decreases the incidence of sports concussions. Accordingly, the present disclosure details one or more methodologies or technologies that allow users, patients, and athletes to increase rotational strength and improve mobility in multiple axes. Increased neck strength and mobility results in quicker recovery from injury and prevents traumatic neck and head injuries.

In an embodiment, the present disclosure details one or more methodologies or technologies that employ a variable applied force, to provide controlled resistance to the cervical spine about one or more axes or planes of movement. In an embodiment, this not only may allow for strengthening in both the traditional flexion and extension planes, but also uniquely may provide constant resistance in the rotational axis.

In an embodiment, the present disclosure details one or more methodologies or technologies including a device configured to provide a distraction movement which may be used to decompress an injured spine. In an embodiment, such complementary exercises may result in balanced strengthening program for the cervical spine which maximizes the neck's range of motion and prevents injury. This may be achieved by providing resistance in both clockwise and counter-clockwise motion, rather than uni-directional loading resistance, such as a non-limiting example of a weight stack.

FIG. 1A shows an electrodynamic contactless resistance or braking system 102 in which one or more methodologies or technologies may be implemented such as, for example, for providing resistance to a rotating disk.

In an embodiment, the electrodynamic contactless resistance system couples to a drive train 111, which one or more methodologies or technologies may be implemented such as, for example, via a planetary gearbox or multi-stage belt-pulley system. Such a system may have a gear ratio of 15:1-75:1. Such ratios may create enough rotational velocity of the disk and mechanical advantage to provide adequate resistance to a patient.

In an embodiment, the drive train couples to a head restraint 113, via a coupler 112. Thus, when a patient is secured into the device via a head restraint 113, rotating either clockwise or counterclockwise will translate a rotational velocity of the rotating disk to apply resistance to the user.

Figure 1B:
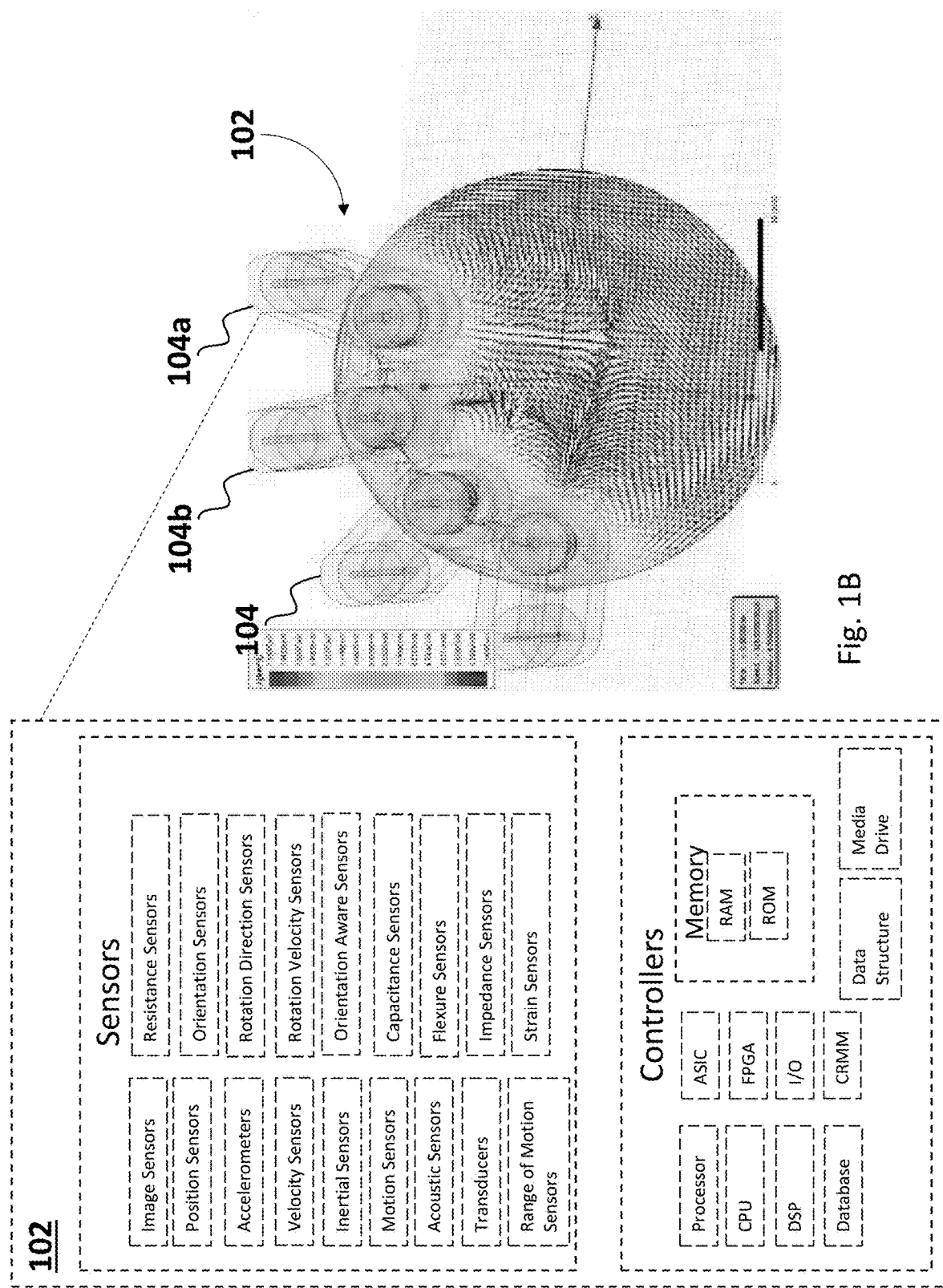
FIG. 1B is a schematic diagram of an electrodynamic contactless resistance or braking assembly according to an embodiment.

FIG. 1B show an electrodynamic contactless resistance or braking system 102 in which one or more methodologies or technologies may be implemented such as, for example, for providing resistance to a rotating disk.

In an embodiment, the electrodynamic contactless resistance or braking system 102 may include a plurality of electromagnets 104.

In an embodiment, an electromagnet 104 may include an air gap 106 formed between a first electromagnet pole 108 and a second electromagnet pole 110.

In an embodiment, an electromagnet 104 is configured to generate a magnetic field of a character and for a duration sufficient to induce eddy currents on an electrically-conductive element moving within the air gap of each of the plurality of electromagnets 104.

Figure 1C:
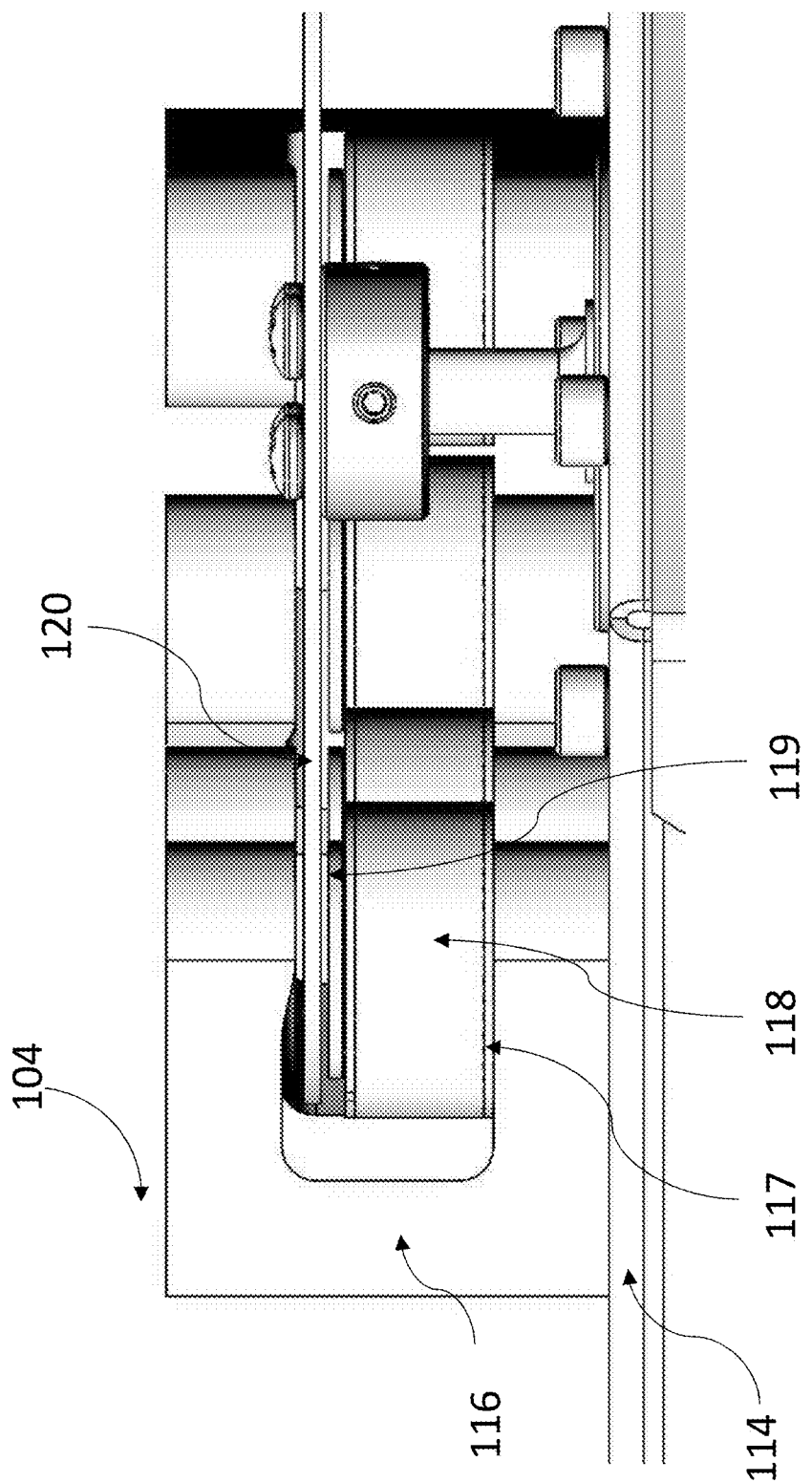
FIG. 1C is a schematic diagram of an electrodynamic contactless resistance or braking assembly according to an embodiment.

Referring to FIGS. 1A, 1B, and 1C in an embodiment, the electrodynamic contactless resistance or braking system 102 may include an array of electromagnets arranged and controlled in a parallel configuration.

In an embodiment, one or more of the electromagnets 104 may comprise a non-ferrous electrically conductive disk 120 form from Aluminum, Copper, etc., or alloys thereof, through an air gap in each magnetic circuit.

In an embodiment, one or more of the electromagnets 104 may take the form of a "C" and consisting of a C-Core 116 and bobbin core 119 made of highly permeable materials such as non-limiting examples of magnetic Iron, Silicon steel, or Permalloy (Nickel/Iron), and low carbon steel.

In an embodiment, the components forming the electromagnets 104 may be mounted to the Chassis 114.

In an embodiment, a coil 118 of wire made of but not limited to Copper is wound around a bobbin 117, in several revolutions equating to 100-1000 amp-turns when electricity is conducted through the coil 118. The core 119, passes through a hole in center of the bobbin.

Figure 2:
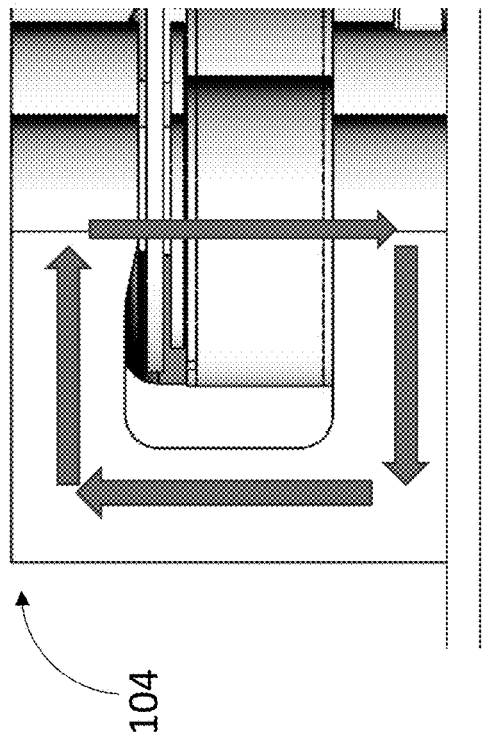
FIG. 2 is a schematic diagram of a magnetic flux path of an electromagnet assembly according to an embodiment.
Figure 3:
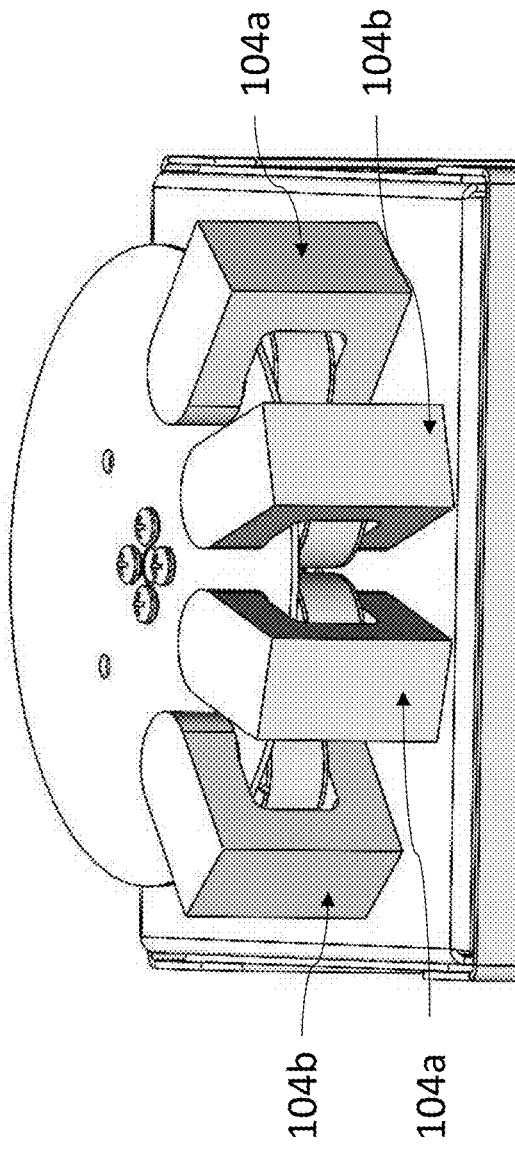
FIG. 3 is a schematic diagram of an array of electromagnets positioned about a conductive disk according to one embodiment.
Figure 4:
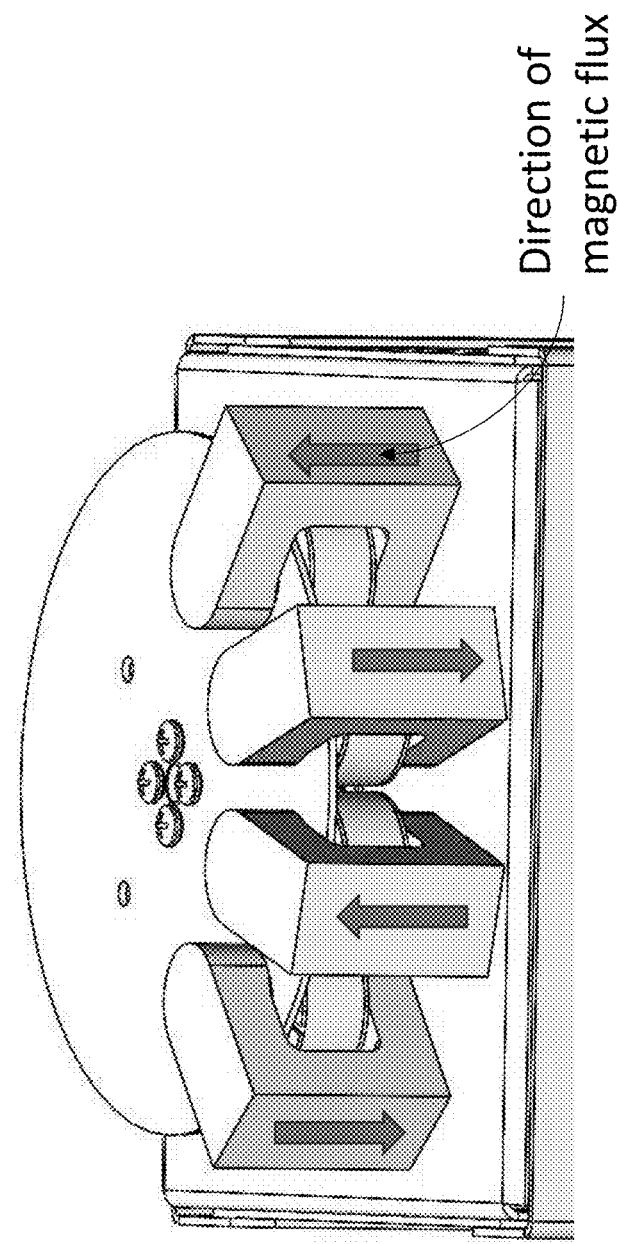
FIG. 4 is a schematic diagram of an alternating magnetic flux paths of adjacent electromagnets according to one embodiment.

In an embodiment, when a current is enacted through coil 118 it creates a magnetic circuit in which flux is passed through the disk as shown in FIG. 2. A magnetic field is created and the discussed is moving either in a clockwise or counterclockwise motion.

Figure 5A:
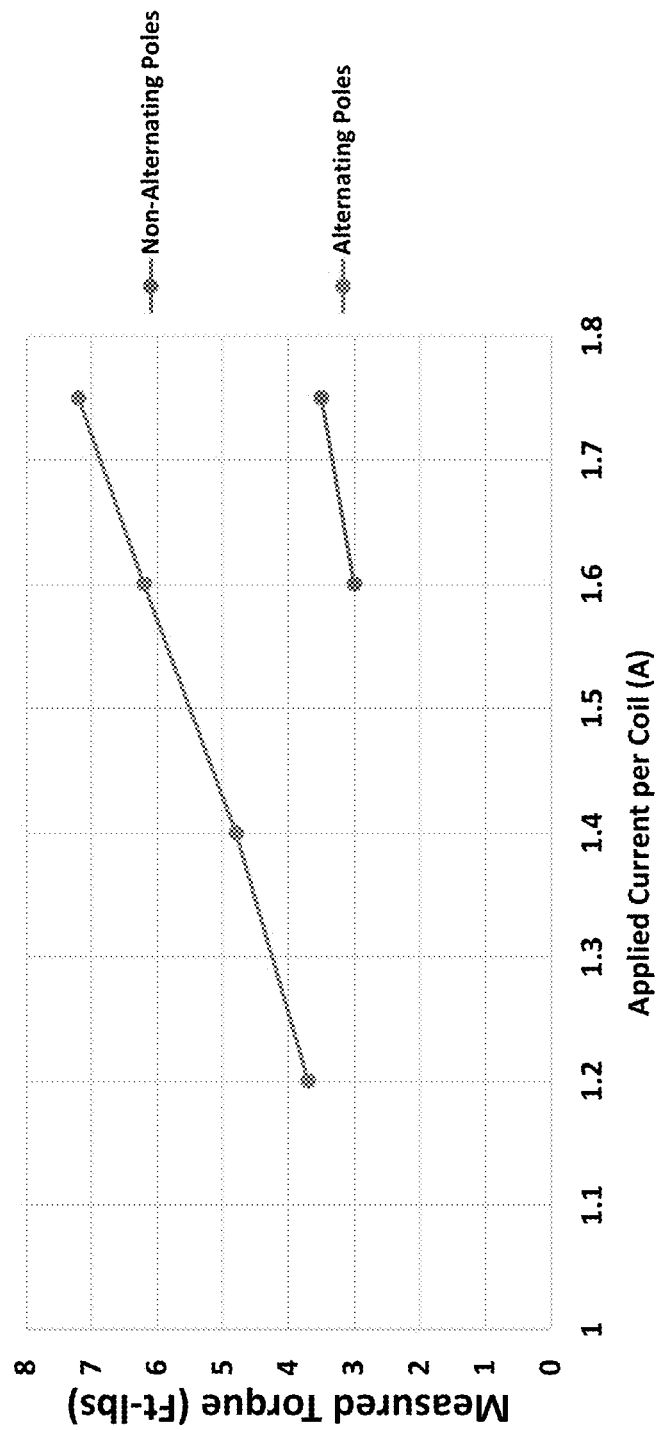
FIG. 5A is an Applied Current per Coil versus Measured Torque plot of an alternating pole configuration compared to a non-alternating pole configuration, from experimental data, according to an embodiment.
Figure 5B:
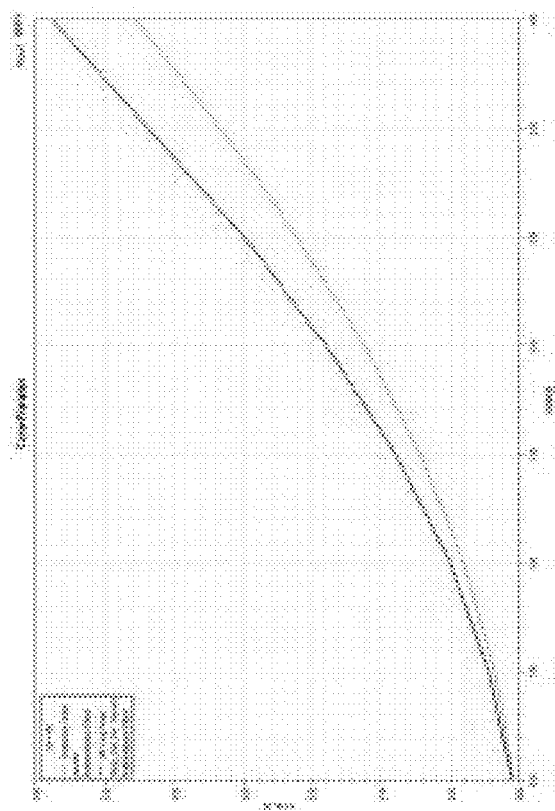
FIG. 5B is an Applied Current per Coil versus Measured Torque plot of an alternating pole configuration compared to a non-alternating pole configuration, from a predictive model using finite element analysis, according to an embodiment.
Figure 5C:
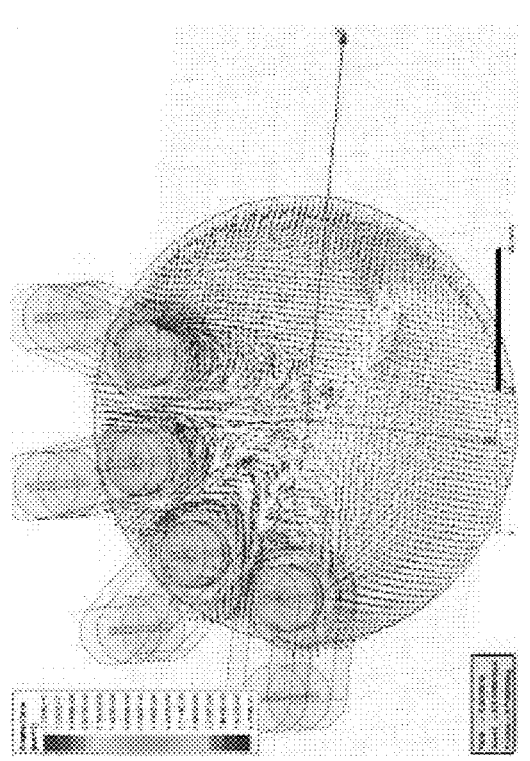
FIG. 5C is a Force Density Plot exerted on a rotating of an alternating pole configuration created by finite element analysis, according to an embodiment.

In an embodiment, the plurality of electromagnets 104 may be arranged and configured to have alternating magnetic field orientations. Such an arrangement may lead to a significant increase in magnetic resistance, as shown by FIGS. 5a and 5b, compared to a non-alternating pole electromagnet array. For example, this strategy may increase the resistance up to 50%, as shown in FIGS. 5a and 5b. In an embodiment, the plurality of electromagnets 104 may be arranged and configured such that at least one of the plurality of electromagnets 104a is configured to have a magnetic field orientation different from a magnetic field orientation of an adjacent electromagnet 104b.

In an embodiment, the plurality of electromagnets 104 may be arranged and configured to have alternating magnetic flux directions.

In an embodiment, the plurality of electromagnets 104 may be arranged and configured such that at least one of the plurality of electromagnets 104a is configured to have a magnetic flux direction different from a magnetic flux direction of an adjacent electromagnet 104b.

In an embodiment, the plurality of electromagnets 104 may be arranged and configured to have alternating magnetic moment orientations.

In an embodiment, the plurality of electromagnets 104 may be arranged and configured such that at least one of the plurality of electromagnets is configured to have a magnetic moment orientation different from a magnetic moment orientation of an adjacent electromagnet.

Figure 9A:
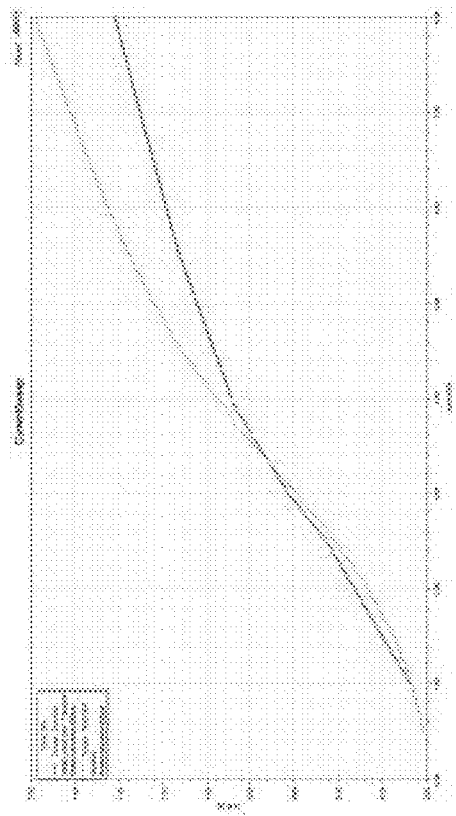
FIG. 9A is an Applied Current per Coil versus Measured Torque plot of a thin disk thickness geometry compared to a thick disk geometry, from a predictive model using finite element analysis, according to an embodiment.
Figure 9B:
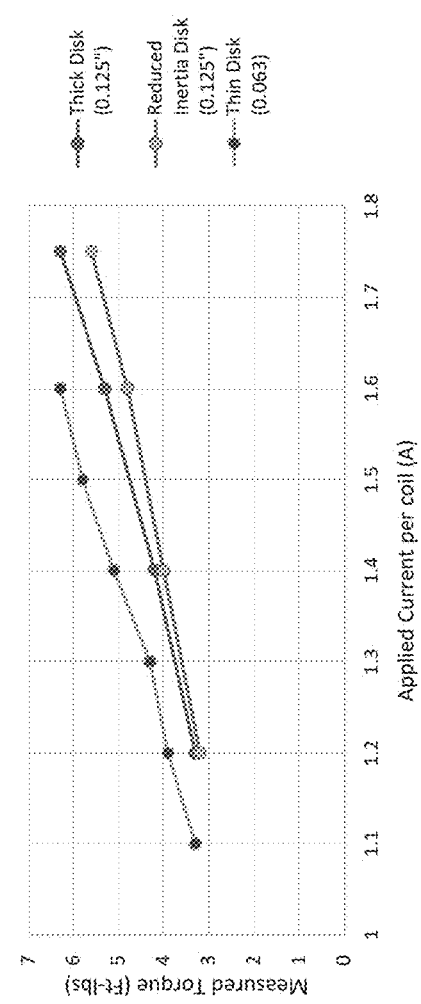
FIG. 9B is an Applied Current per Coil versus Measured Torque plot of a thin disk thickness geometry compared to a thick disk geometry, from experimental data, according to an embodiment.

In an embodiment, reducing the thickness of the electrically conductive disk 120 may lead to improved resistance by up 20%. As a non-limiting example, reducing the electrically conductive disk 120 thickness from 0.125" to 0.063", as shown by FIGS. 9a and 9b.

Figure 10:
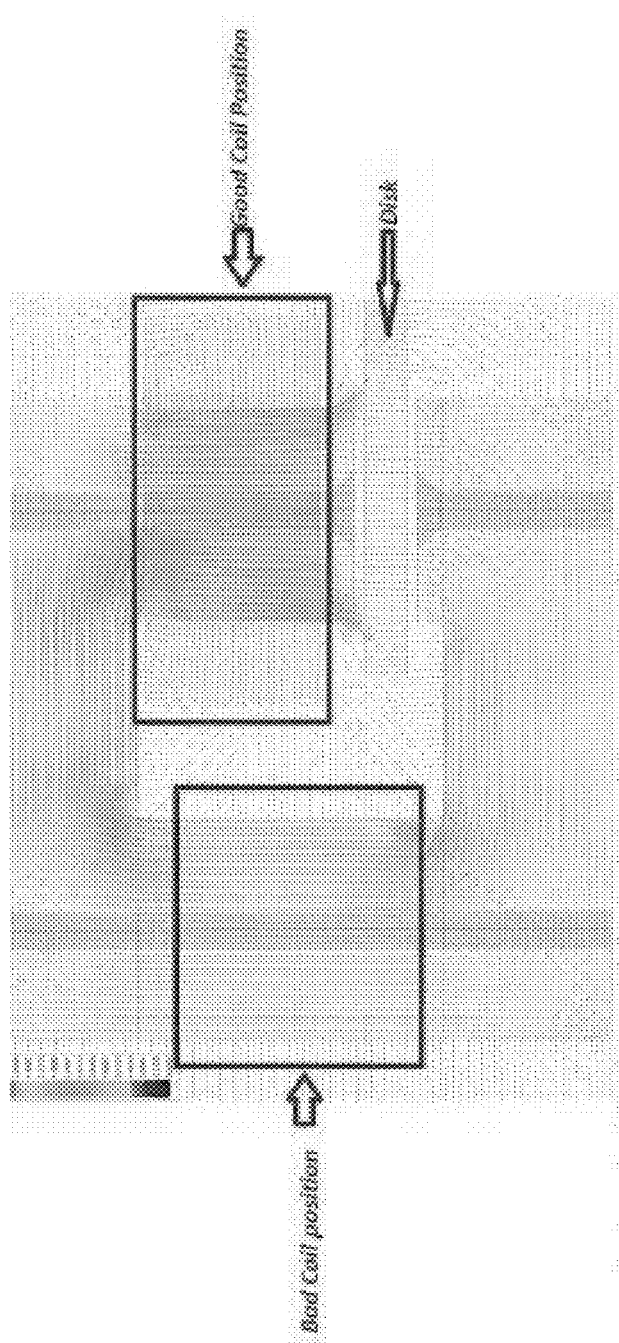
FIG. 10 is a cross sectional view of magnetic flux through a disk according to an embodiment.

In an embodiment, a good position of the coil is in near proximity to the disk as shown in FIG. 10, in a condition where the flux is pushed in a non-alternating pole configuration.

In an embodiment, both a controller and at least one sensor to monitor system use motion or force to provide system feedback to appropriately set applied pre-determined resistance from the electrodynamic braking system 102.

In an embodiment, the electrodynamic contactless resistance or braking system 102 may include a controller 110 operatively coupled to each of the plurality of electromagnets 104. In an embodiment, the controller 110 may be configured to operate the plurality of electromagnets in parallel.

In an embodiment, the controller 110 may be configured to vary a magnetic flux and a magnetic flux direction for each of the plurality of electromagnets.

In an embodiment, the controller 110 may be configured to vary a magnetic flux and a magnetic flux direction for each of the plurality of electromagnets such that at least one of the plurality of electromagnets is configured to have a magnetic flux direction different from a magnetic flux direction of an adjacent electromagnet.

In an embodiment, the controller 110 may be configured to vary magnetic moment magnitude and magnetic moment orientation for each of the plurality of electromagnets.

In an embodiment, the controller 110 may be configured to vary a magnetic field strength and a magnetic field orientation for each of the plurality of electromagnets.

In an embodiment, the controller 110 may be configured to actively adjust an amount of applied current and a direction of the applied current, to each of the plurality of electromagnets so as to maintain a linearly varying torque on the electrically-conductive element.

Figure 6:
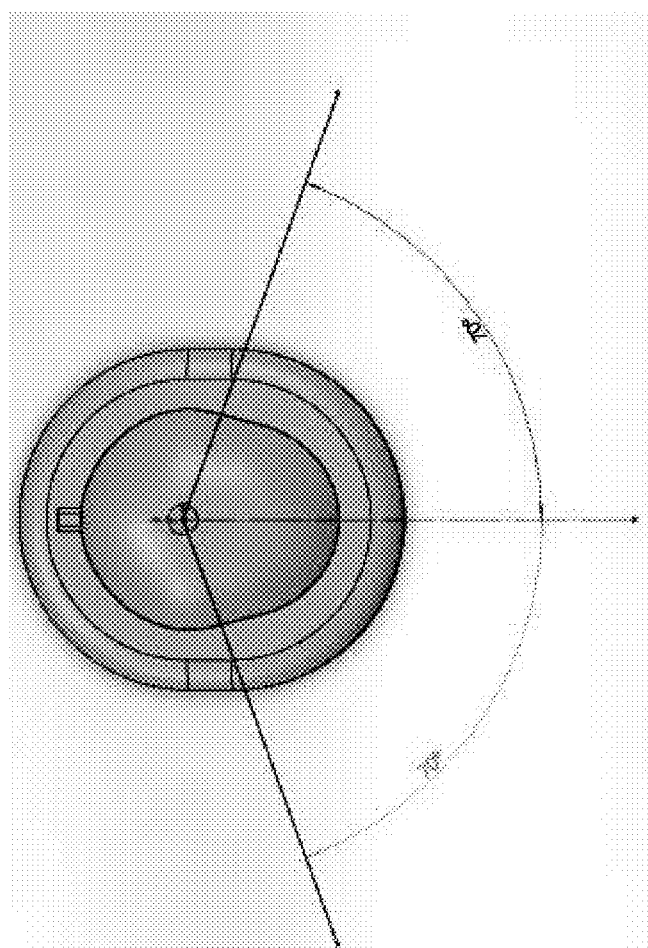
FIG. 6 is a diagram showing a rotational range of the user used as input to a controller according to an embodiment.
Figure 7A:
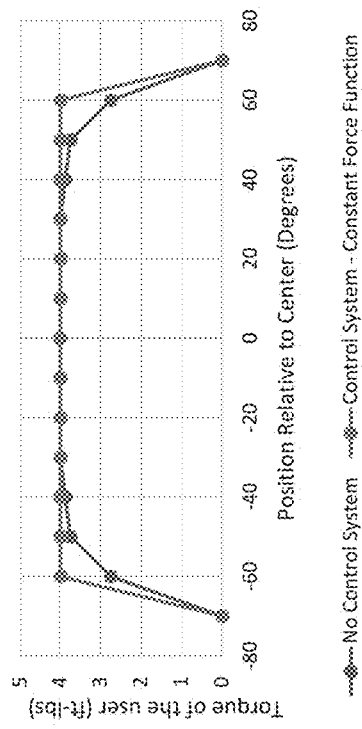
FIG. 7A is a plot of relative position and applied resistance to the user compared to an embodiment using a controller and sensor system compared to another embodiment with no controller and sensor system, according to an embodiment.
Figure 7B:
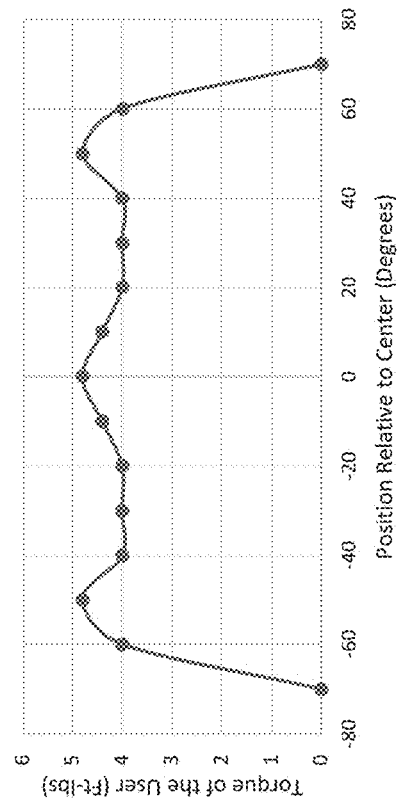
FIG. 7B is a plot of relative position and applied resistance with a pre-determined protocol to adjust the applied force at certain points of rotational position, according to an embodiment.
Figure 7C:
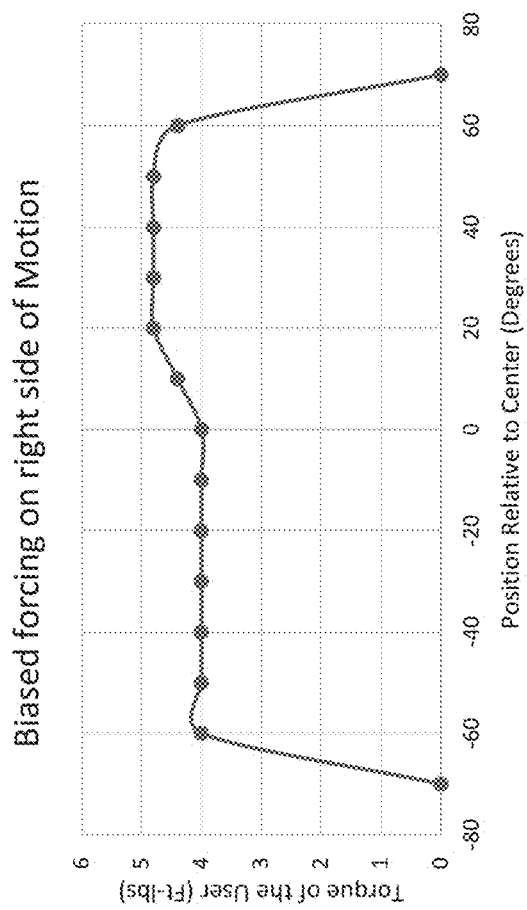
FIG. 7C is a plot of relative position and applied resistance with a pre-determined protocol to adjust the applied force to apply higher load to specific range of rotational position to help focus strengthening or therapy according to their physical condition, according to an embodiment.

In an embodiment, the controller 110 may be configured to actively adjust an amount of applied current and a direction of the applied current, to each of the plurality of electromagnets so as to maintain a linearly varying torque on the electrically-conductive element in a pre-determined resistance method relative to position of motion, described by FIG. 6. The resultant resistance by position is described within an exercise is described FIGS. 7a, 7b, and 7c.

Figure 8A:
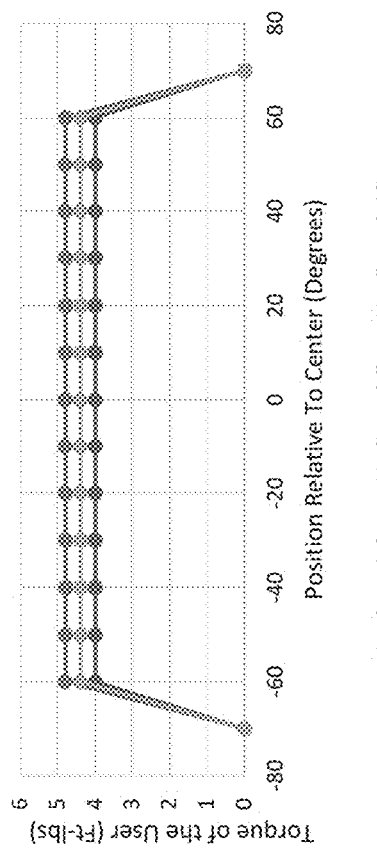
FIG. 8A is a plot of relative position and applied resistance with a pre-determined protocol to adjust the applied resistance for different ranges of reps within a set of exercises, according to an embodiment.

In an embodiment, the controller 110 may be configured to actively adjust an amount of applied current and a direction of the applied current, to each of the plurality of electromagnets so as to maintain a pre-determined torque on the electrically-conductive element in a pre-determined resistance method or protocol relative to position of motion that varies depending on the rep number in a set of exercises, as described by FIG. 8a.

Figure 8B:
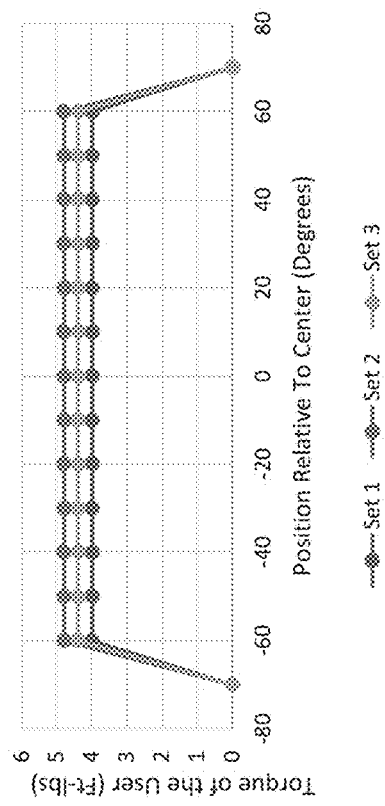
FIG. 8B is a plot of relative position and applied resistance with a pre-determined protocol to adjust the applied resistance for different sets within a series of sets of exercises, according to an embodiment.

In an embodiment, the controller 110 may be configured to actively adjust an amount of applied current and a direction of the applied current, to each of the plurality of electromagnets so as to maintain a pre-determined torque on the electrically-conductive element in a pre-determined resistance method or protocol relative to position of motion that varies depending on the set number in a number set of exercises conducted, as described by FIG. 8b.

In an embodiment, the pole geometry of the electromagnet 104 may not have sharp corners or rapid increases or decreases in surface area where magnetic flux is transferred, with non-limiting examples of circles or ovals.

In an embodiment, the electromagnet 104 may have an air-gap flux density that ranges from about 0.001 T/in^2 to 4 T/in^2.

In an embodiment, the electromagnet 104 may have an air gap range between pole surfaces from 0.035 inches to 0.085 inches, not including the thickness of the electrically conductive disk 102.

In an embodiment, the electrically conductive disk 102 diameter may vary from 3 inches to 7 inches.

In an embodiment, the proximity of a pole-to-pole edge distance of Electromagnet 104a to Electromagnet 104b at its nearest point may range from 0.025 inches to 0.125 inches.

Eddy Current Resistance

In an embodiment, application of the described disclosure above may be used outside of exercise training. Such applications may be used where parts need not be replaced due to mechanical wear and/or if power efficiency is needed in braking systems.

In an embodiment, a plurality of electromagnets may be arranged with a rotating electrically conductive disk for braking a system that may be used in non-limiting examples of a train, roller coaster, cable drawn winch, transportation/freight trucking, personal or industrial power tools such as chop saws, ban saws, elevators or personal rigging/rock climbing equipment, bicycles, motor cycles, hydraulic power turbines, etc.

In an embodiment, a plurality of electromagnets may be arranged with a linear rail made of conductive material for braking a system that may be used in non-limiting examples of a train, roller coaster, cable drawn winch, transportation/freight trucking, personal or industrial power tools such as chop saws, ban saws, elevators or personal rigging/rock climbing equipment, bicycles, motorcycles, hydraulic power turbines, etc.

What is claimed is:

1. An electrodynamic contactless braking system comprising:
    a plurality of electromagnets, each electromagnet having an air gap formed between a first electromagnet pole and a second electromagnet pole, and each electromagnet configured to generate a magnetic field of a character and for a duration sufficient to induce eddy currents on an electrically-conductive element moving withing the air gap of each of the plurality of electromagnets; and
    a controller operatively coupled to each of the plurality of electromagnets, the controller configured to operate the plurality of electromagnets in parallel,
    wherein the electrodynamic contactless braking system is operably coupled to a drive train and a head restraint such that, when a user is secured via the head restraint, rotation about an axis will result in an applied resistance to the head restraint via the electrically-conductive element moving within the air gap of each of the plurality of electromagnets.

2. The electrodynamic contactless braking system of claim 1, wherein the plurality of electromagnets is arranged and configured to have alternating magnetic field orientations.

3. The electrodynamic contactless braking system of claim 1, wherein the plurality of electromagnets is arranged and configured such that at least one of the plurality of electromagnets is configured to have a magnetic field orientation different from a magnetic field orientation of an adjacent electromagnet.

4. The electrodynamic contactless braking system of claim 1, wherein the plurality of electromagnets is arranged and configured to have alternating magnetic flux directions.

5. The electrodynamic contactless braking system of claim 1, wherein the plurality of electromagnets is arranged and configured such that at least one of the plurality of electromagnets is configured to have a magnetic flux direction different from a magnetic flux direction of an adjacent electromagnet.

6. The electrodynamic contactless braking system of claim 1, wherein the plurality of electromagnets is arranged and configured to have alternating magnetic moment orientations.

7. The electrodynamic contactless braking system of claim 1, wherein the plurality of electromagnets is arranged and configured such that at least one of the plurality of electromagnets is configured to have a magnetic moment orientation different from a magnetic moment orientation of an adjacent electromagnet.

8. The electrodynamic contactless braking system of claim 1, wherein the controller is configured to vary a magnetic flux and a magnetic flux direction for each of the plurality of electromagnets.

9. The electrodynamic contactless braking system of claim 1, wherein the controller is configured to vary a magnetic flux and a magnetic flux direction for each of the plurality of electromagnets such that at least one of the plurality of electromagnets is configured to have a magnetic flux direction different from a magnetic flux direction of an adjacent electromagnet.

10. The electrodynamic contactless braking system of claim 1, wherein the controller is configured to vary magnetic moment magnitude and magnetic moment orientation for each of the plurality of electromagnets.

11. The electrodynamic contactless braking system of claim 1, wherein the controller is configured to vary a magnetic field strength and a magnetic field orientation for each of the plurality of electromagnets.

12. The electrodynamic contactless braking system of claim 1, wherein the controller is configured to actively adjust an amount of applied current and a direction of the applied current, to each of the plurality of electromagnets so as to maintain a linearly varying torque on the electrically-conductive element.

13. The electrodynamic contactless braking system of claim 1, wherein the measure of the air gap formed between the first electromagnet pole and the second electromagnet pole ranges from 0.03 inches to 0.085 inches.

14. The electrodynamic contactless braking system of claim 1, wherein the measure of the air gap formed between the first electromagnet pole and the second electromagnet pole ranges from 0.055 inches to 0.085 inches.

15. The electrodynamic contactless braking system of claim 1, wherein an air-gap flux density ranges from 0.001 $T/in^2$ to 4 $T/in^2$.

16. The electrodynamic contactless braking system of claim 1, wherein the electrically-conductive element moving withing the air gap of each of the plurality of electromagnets comprises an electrically conductive disk having a diameter ranging from 3 inches to 7 inches.

17. The electrodynamic contactless braking system of claim 1, wherein pole-to-pole edge distance from adjacent electromagnets at its nearest point ranges from 0.025 inches to 0.125 inches.

18. An orthopedic device comprising:
a head restraint; and
means for applying a contactless drag force on an electrically-conductive element forming part of a spinal resistance assembly, the means for applying the contactless drag force including:
 a plurality of electromagnets, each electromagnet having an air gap formed between a first electromagnet pole and a second electromagnet pole, and each electromagnet configured to generate a magnetic field of a character and for a duration sufficient to induce eddy currents on the electrically-conductive element moving within the air gap of each of the plurality of electromagnets, and
 a controller operatively coupled to each of the plurality of electromagnets, the controller configured to operate the plurality of electromagnets in parallel,
wherein the means for applying the contactless drag force is configured to apply resistance to movement of the head restraint via the electrically-conductive element moving within the air gap of each of the plurality of electromagnets.

\* \* \* \* \*